(12) United States Patent
Rocznik et al.

(10) Patent No.: US 10,996,693 B1
(45) Date of Patent: May 4, 2021

(54) HAPTIC FEEDBACK ACTUATION VIA OPEN/CLOSED LOOP CONTROL SYSTEM

(71) Applicant: Robert Bosch GmbH, Stuttgart (DE)

(72) Inventors: Thomas Rocznik, Mountain View, CA (US); Christian Peters, Mountain View, CA (US); Seow Yuen Yee, Mountain View, CA (US); Ning Wang, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/792,714

(22) Filed: Feb. 17, 2020

(51) Int. Cl.
  *H04B 3/36* (2006.01)
  *G05D 19/02* (2006.01)
  *G08B 6/00* (2006.01)

(52) U.S. Cl.
  CPC .............. *G05D 19/02* (2013.01); *G08B 6/00* (2013.01)

(58) Field of Classification Search
  None
  See application file for complete search history.

(56) References Cited

U.S. PATENT DOCUMENTS

| | | | |
|---|---|---|---|
| 9,740,290 B2 | 8/2017 | Rosenberg et al. | |
| 9,811,194 B2 | 11/2017 | Peshkin et al. | |
| 9,992,592 B1 * | 6/2018 | Alam | H04R 29/00 |
| 2010/0231508 A1 | 9/2010 | Cruz-Hernandez et al. | |
| 2010/0290153 A1 * | 11/2010 | Hampshire | G11B 5/59605 360/77.08 |
| 2010/0328053 A1 | 12/2010 | Yeh et al. | |
| 2010/0328229 A1 | 12/2010 | Weber et al. | |
| 2012/0236152 A1 * | 9/2012 | De Wind | B60K 35/00 348/148 |
| 2014/0307889 A1 * | 10/2014 | Hardell | G10K 11/178 381/71.11 |
| 2015/0146000 A1 * | 5/2015 | De Wind | B60R 1/12 348/148 |
| 2015/0153830 A1 | 6/2015 | Hirose et al. | |
| 2016/0305197 A1 * | 10/2016 | Gajji | E21B 17/1078 |
| 2016/0333682 A1 * | 11/2016 | Griffing | E21B 47/0228 |
| 2017/0076564 A1 * | 3/2017 | Cruz-Hernandez | G08B 6/00 |
| 2017/0102308 A1 * | 4/2017 | Gillette, II | F01M 11/10 |
| 2017/0190041 A1 * | 7/2017 | Dey, IV | B25F 5/006 |
| 2019/0004608 A1 * | 1/2019 | Levesque | G06F 1/1652 |
| 2019/0079584 A1 * | 3/2019 | Bonanno | G06F 3/0414 |
| 2019/0296627 A1 * | 9/2019 | Takahashi | H02K 33/16 |
| 2019/0385420 A1 * | 12/2019 | Khoshkava | G06F 3/016 |
| 2019/0385422 A1 * | 12/2019 | Cruz-Hernandez | G06F 3/0414 |

* cited by examiner

*Primary Examiner* — Julie B Lieu
(74) *Attorney, Agent, or Firm* — Michael Best & Friedrich LLP (57) ABSTRACT

A method of countering a residual resonance experienced by an electronic communication device due to an activation of an actuator within the housing of the electronic communication device. The method includes determining an effective vibration behavior of the electronic communication device when activating the actuator according to a predetermined pattern, determining, based on the effective vibration behavior, a desired counter actuation signal, activating the actuator according to the predetermined pattern for a predetermined period of time, and upon expiration of the predetermined period of time, activating the actuator according to the desired counter actuation signal to counter an residual resonance experienced by the electronic communication device.

15 Claims, 9 Drawing Sheets

HAPTIC FEEDBACK ACTUATION VIA OPEN/CLOSED LOOP CONTROL SYSTEM

BACKGROUND OF THE INVENTION

Some electronic communication devices, such as mobile telephones and two-way radios, include one or more actuators to provide haptic feedback to a user. While most systems include a single actuator for providing feedback, some systems may include more than one actuator.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As previously mentioned, electronic communication devices may include one or more actuators to provide haptic feedback to a user. For example, in communication devices including a touchscreen user interface display, the device may be configured to vibrate, via the one or more actuators, in response to a user touching the display. Such feedback, however, may not reflect the particular kind of touch (for example, amount of pressure or duration of touch). Accordingly, embodiments presented herein provide, among other things, improved haptic feedback from one or more actuators of an electronic communication device.

One example embodiment provides an electronic communication device. The electronic communication device includes an actuator positioned within a housing of the electronic communication device and an electronic processor communicatively coupled to the actuator. The electronic processor is configured to determine an effective vibration behavior of the electronic communication device when activating the actuator according to a predetermined pattern, determine, based on the effective vibration behavior, a desired counter actuation signal, and activate the actuator according to the predetermined pattern for a predetermined period of time. The electronic processor is further configured to, upon expiration of the predetermined period of time, activate the actuator according to the desired counter actuation signal to counter a residual resonance experienced by the electronic communication device.

Another example embodiment provides a method of countering a residual resonance experienced by an electronic communication device due to an activation of an actuator within the housing of the electronic communication device. The method includes determining an effective vibration behavior of the electronic communication device when activating the actuator according to a predetermined pattern, determining, based on the effective vibration behavior, a desired counter actuation signal, activating the actuator according to the predetermined pattern for a predetermined period of time, and upon expiration of the predetermined period of time, activating the actuator according to the desired counter actuation signal to counter a residual resonance experienced by the electronic communication device.

Another example embodiment provides an electronic communication system. The electronic communication system includes an actuator positioned within a housing of the electronic communication system and an electronic processor communicatively coupled to the actuator. The electronic processor is configured to determine an effective vibration behavior of the electronic communication system when activating the actuator according to a predetermined pattern, determine, based on the effective vibration behavior, a desired counter actuation signal, and activate the actuator according to the predetermined pattern for a predetermined period of time. The electronic processor is further configured to, upon expiration of the predetermined period of time, activate the actuator according to the desired counter actuation signal to counter a residual resonance experienced by the electronic communication system.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
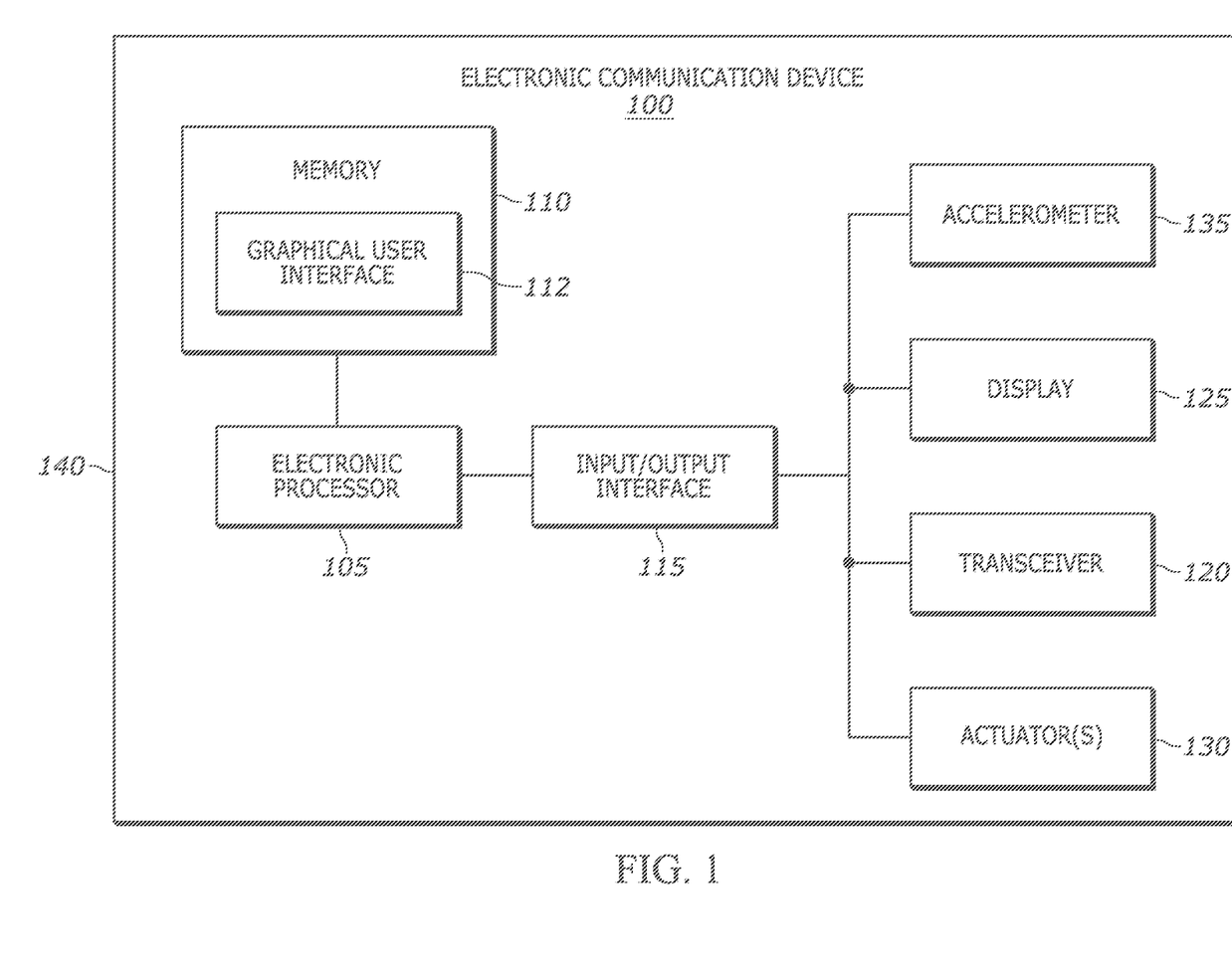
FIG. 1 is a diagram of an electronic communication device in accordance with some embodiments.
Figure 2:
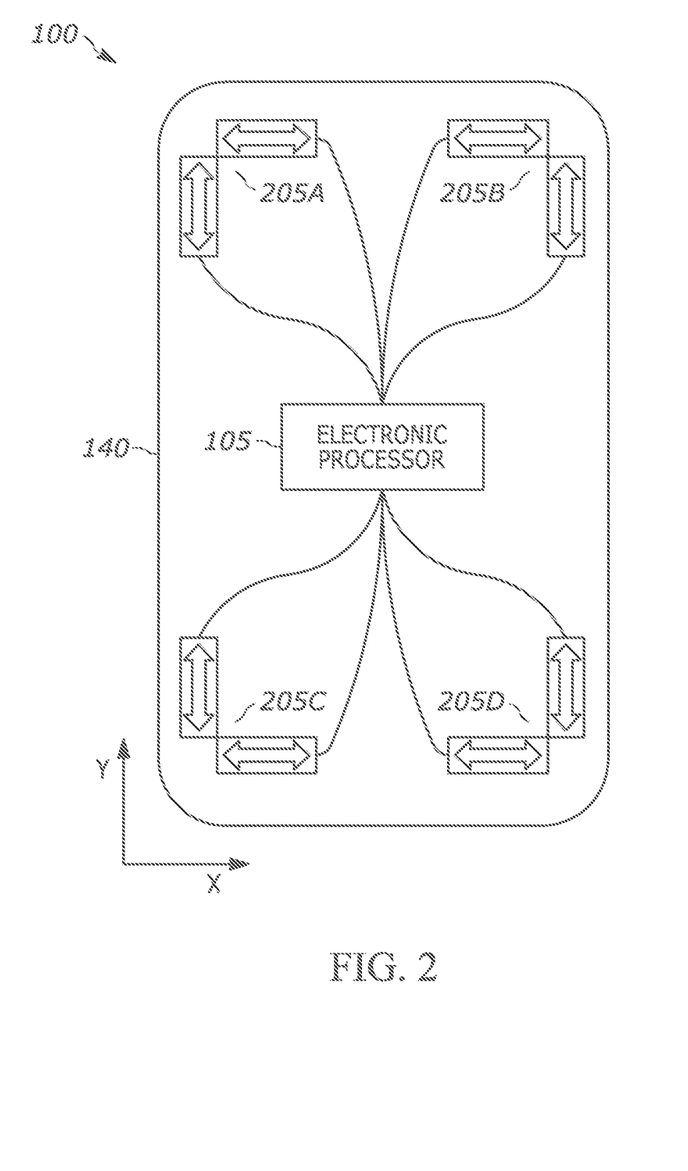
FIG. 2 is a free body diagram of the output forces of the actuators of the electronic communication device of FIG. 1 in accordance with some embodiments.

FIG. 1 is a diagram of an example of an electronic communication device 100. In the embodiment illustrated, the electronic communication device 100 includes an electronic processor 105, a memory 110, an input/output interface 115, a transceiver 120, a touch screen display 125, one or more actuators 130, and an accelerometer 135. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. The electronic communication device 100 further includes a housing 140 within which the actuator(s) 130 and some or all of the components of the electronic communication device 100 are positioned within.

The electronic processor 105 obtains and provides information (for example, from the memory 110 and/or the input/output interface 115), and processes the information by executing one or more software instructions or modules, capable of being stored, for example, in a random access memory ("RAM") area of the memory 110 or a read only memory ("ROM") of the memory 110 or another non-transitory computer readable medium (not shown). The software can include firmware, one or more applications, program data, filters, rules, one or more program modules, and other executable instructions. The electronic processor 105 is configured to retrieve from the memory 110 and execute, among other things, software related to the control processes and methods described herein.

The memory 110 can include one or more non-transitory computer-readable media, and includes a program storage area and a data storage area. The program storage area and the data storage area can include combinations of different types of memory, as described herein. In the embodiment illustrated, the memory 110 stores, among other things, data and instructions for generating a graphical user interface (GUI) 112 (described in detail below).

The input/output interface 115 is configured to receive input and to provide output to peripherals. The input/output interface 115 obtains information and signals from, and provides information and signals to, (for example, over one or more wired and/or wireless connections) devices both internal and external to the electronic communication device 100.

The electronic processor 105 is configured to control the transceiver 120 to transmit and receive voice and other data to and from the electronic communication device 100. The electronic processor 105 encodes and decodes digital data sent and received by the transceiver 120, including audio communications. The transceiver 120 transmits and receives radio signals to and from various wireless communications networks. The electronic processor 105 and the transceiver 120 may include various digital and analog components, which for brevity are not described herein and which may be implemented in hardware, software, or a combination of both. Some embodiments include separate transmitting and receiving components, for example, a transmitter and a receiver, instead of a combined transceiver 120.

The electronic communication device 100 implements the graphical user interface 112, generated by the electronic processor 105, from instructions and data stored in the memory 110, and presented on the touch screen display 125. The touch screen display 125 is a suitable touch-sensitive interface display such as, for example, a liquid crystal display (LCD) touch screen, or an organic light-emitting diode (OLED) touch screen. The touch screen display 125 displays output and receives user input using detected physical contact (for example, via detected capacitance or resistance).

The one or more actuators 130 are configured to provide a vibration/haptic output to a user of the electronic communication device 100. The actuator(s) 130 may be any kind of suitable component configured to provide vibrations when activated (for example, electroactive polymer elements, piezoelectric actuators, ultrasonic actuators, and the like). The electronic processor 105 is communicatively coupled to each of the one or more actuators 130 and configured to activate the one or more actuators 130 to vibrate one or more areas of the electronic communication device 100. The processor 105 may activate the actuator(s) 130 so as to produce one or more of a predetermined vibration pattern for a predetermined amount of time. Such patterns may be produced in response to a user input (for example, a touch on the display 125) or to alert a user (for example, in response to receiving an incoming audio call).

The accelerometer 135 is configured to measure an acceleration (direction of motion and speed) experienced by the device 100. The electronic processor 105 may be configured to determine the amount of haptic feedback (including that produced by or resulting from activation of the actuator(s) 130) experienced by the device 100 based on one or more measurements from the accelerometer 135. As explained in more detail below, the electronic processor 105 may be configured to determine a dampening effect of a surface environment experienced by the electronic communication device 100. A surface environment experienced by the electronic communication device 100 may be any kind of physical object, force, and/or surface that is making contact with the device 100 (for example, a surface in which the device 100 is resting on or when the device 100 is being held by a user).

In some embodiments, the electronic communication device 100 is a smart telephone. In other embodiments, the electronic communication device 100 may be a tablet computer, a smart watch, a portable radio, a combination of the foregoing, or another portable or mobile electronic device containing software and hardware enabling it to operate as described herein.

As mentioned above, the electronic processor 105 is configured to activate the one or more actuators 130 to provide a haptic output. The type of haptic output may be dependent on the number, type, and placement of the actuators 130. In the embodiments illustrated in FIGS. 2 and 3A-3G, the electronic communication device 100 includes four pairs of actuators 205A-D. Each pair of actuators 205A-D includes two perpendicular-placed actuators 130. Each of the pairs of actuators 205A-D are positioned in a respective corner within the housing 140 of the electronic communication device 100. Each of the actuators 130 of the pairs 205A-D are communicatively coupled to the electronic processor 105. Alternatively, in some embodiments, the electronic communication device 100 includes four multi-dimensional actuators (3D haptic actuators), each of which may be positioned in a corner within the housing 140 of the electronic communication system 100. For ease of description, FIGS. 2 and 3A-G are described in terms of actuator pairs 205A-D. It should be understood however that additional types/configurations of actuators (including the single multidimensional actuator embodiments described above) and/or actuator positions may be utilized for similar processes described below.

Figure 3A:
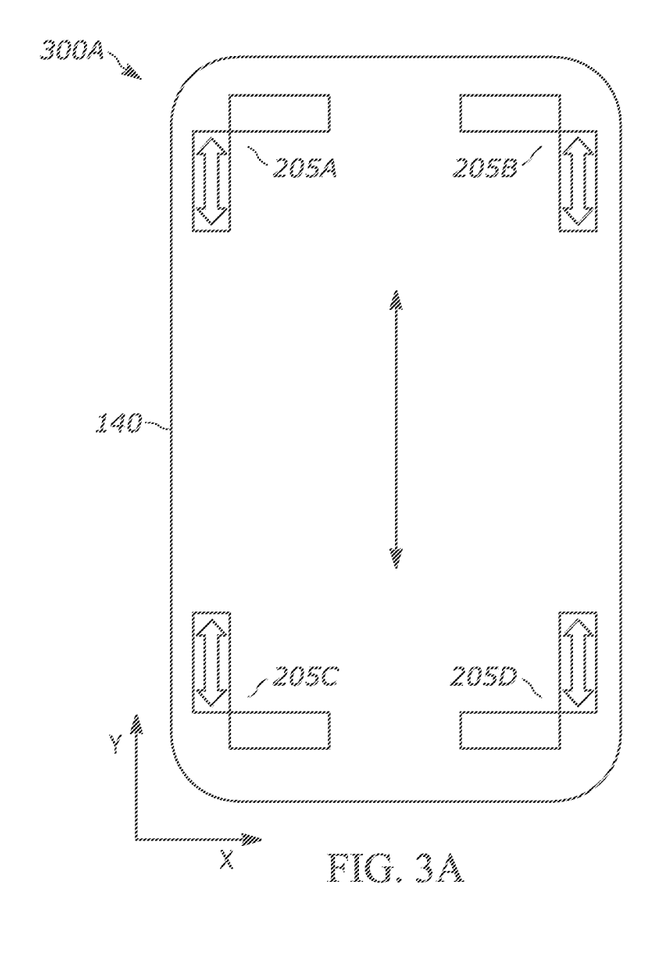
FIG. 3A is a free body diagram of the output forces of the actuators of the electronic communication device of FIG. 1 in accordance with some embodiments.
Figure 3B:
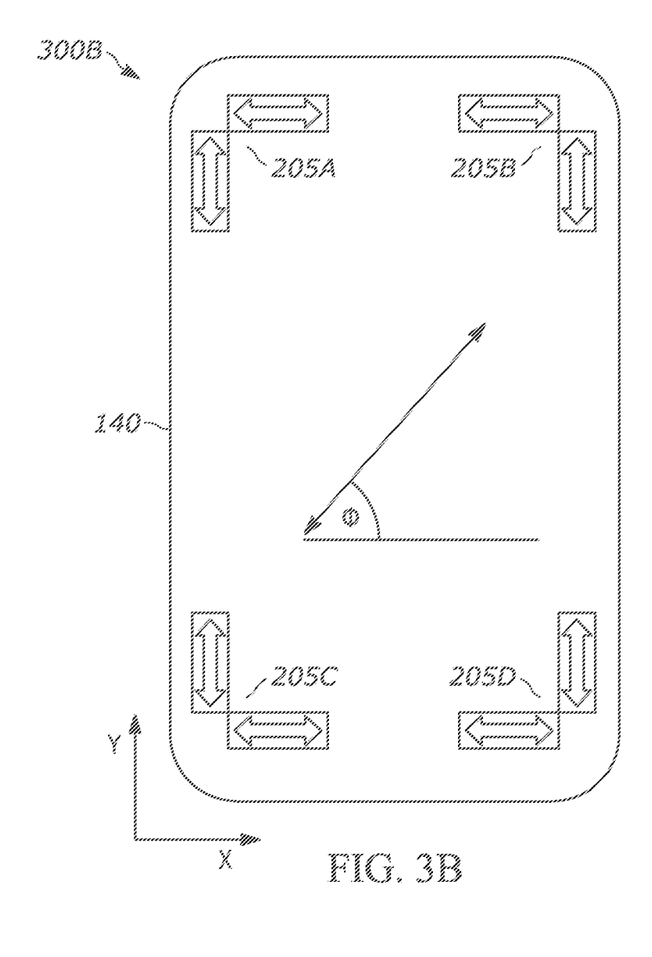
FIG. 3B is a free body diagram of the output forces of the actuators of the electronic communication device of FIG. 1 in accordance with some embodiments.

The electronic processor 105, as mentioned above, may activate the one or more actuators 130 to produce one or more predetermined patterns. For example, diagram 300A of FIG. 3A illustrates a linear vibration pattern, where the device 100 vibrates in a particular linear direction (in the X or Y direction). Such a pattern may be produced, for example, by activating one of the actuators 130 of a respective pair 205A-D that are on the same axis (X or Y axis) at a similar frequency, amplitude, and phase. By adjusting the frequency, amplitude, and/or phase, the controller 105 may be able to vibrate the device 100 in an angular direction φ as shown in diagram 300B of FIG. 3B.

Figure 3C:
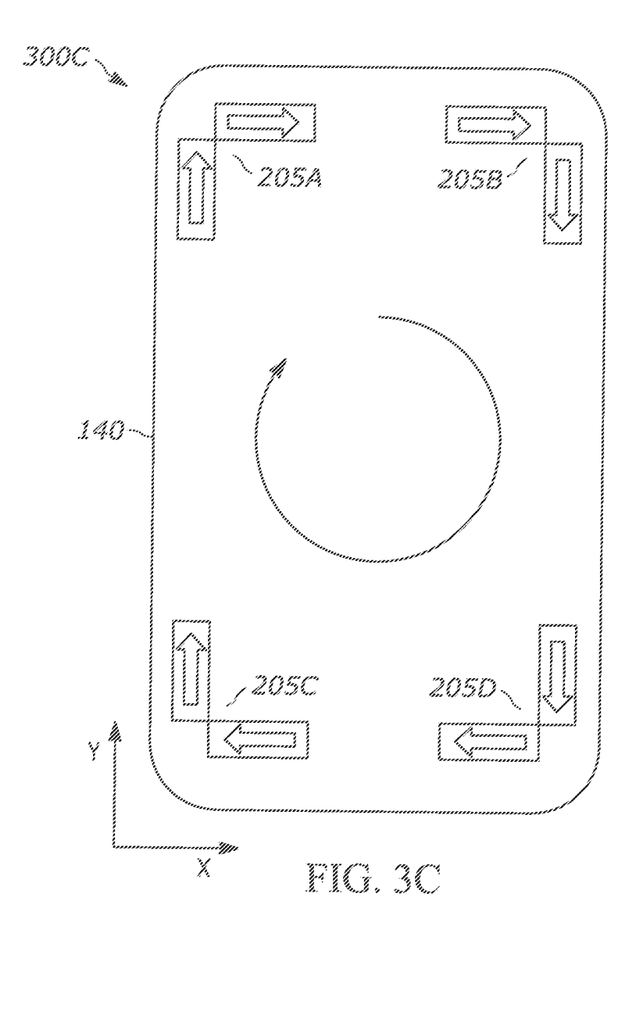
FIG. 3C is a free body diagram of the output forces of the actuators of the electronic communication device of FIG. 1 in accordance with some embodiments.
Figure 3D:
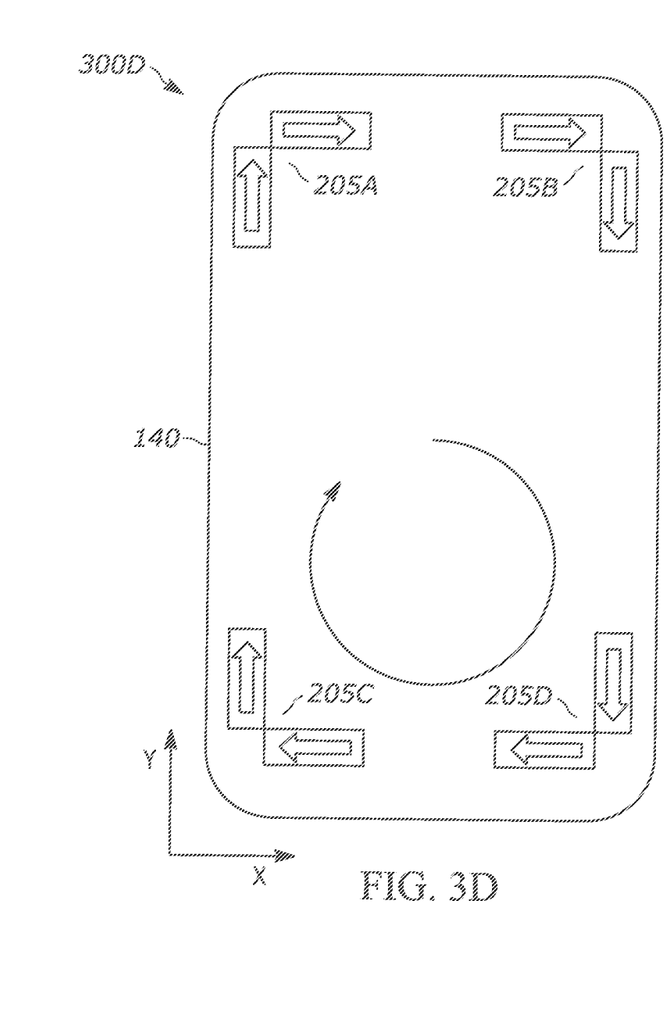
FIG. 3D is a free body diagram of the output forces of the actuators of the electronic communication device of FIG. 1 in accordance with some embodiments.

When the electronic processor 105 activates all the actuators 130 at approximately the same (or, ideally, the same) frequency and their respective phases of pairs 205A and 205C are 0° and pairs 205B and 205D are 180°, the resulting pattern is a circular vibration as shown in diagram 300C of FIG. 3C. As shown in diagram 300D of FIG. 3D, the center of the circular vibration may be adjusted by varying the amplitude provided to one or more of the actuator pairs. For example, the center of the vibration may be shifted downward by controlling pairs 205A and 205B at approximately the same amplitude, that amplitude being greater than an approximately same amplitude in which pairs 205C and 205D are being controlled at. The center of the circular vibration may be positioned outside of the housing 140 of the device 100.

Figure 3E:
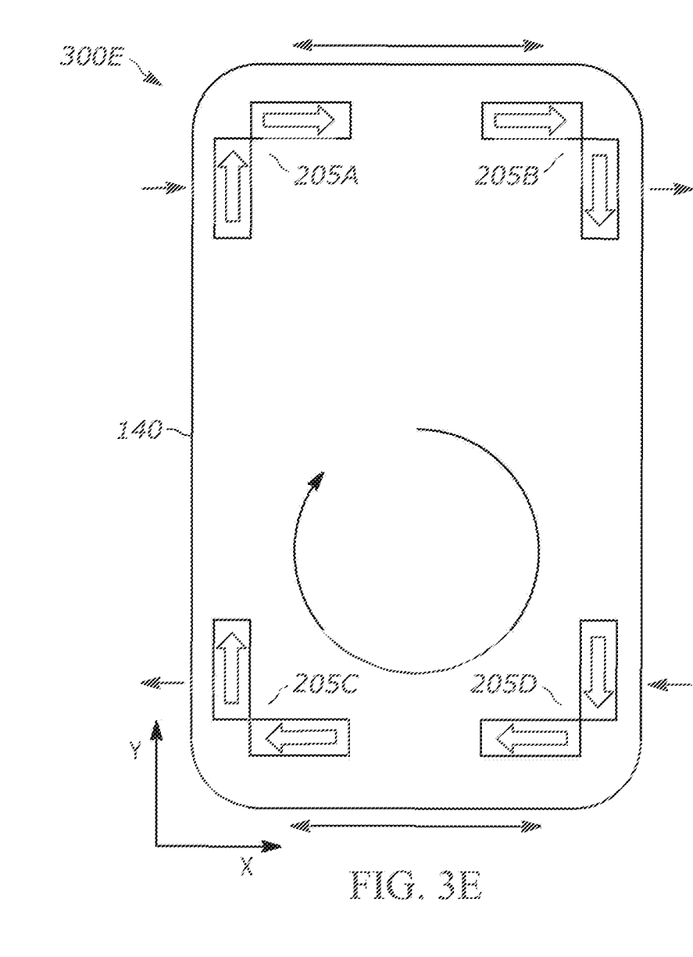
FIG. 3E is a free body diagram of the output forces of the actuators of the electronic communication device of FIG. 1 in accordance with some embodiments.
Figure 3F:
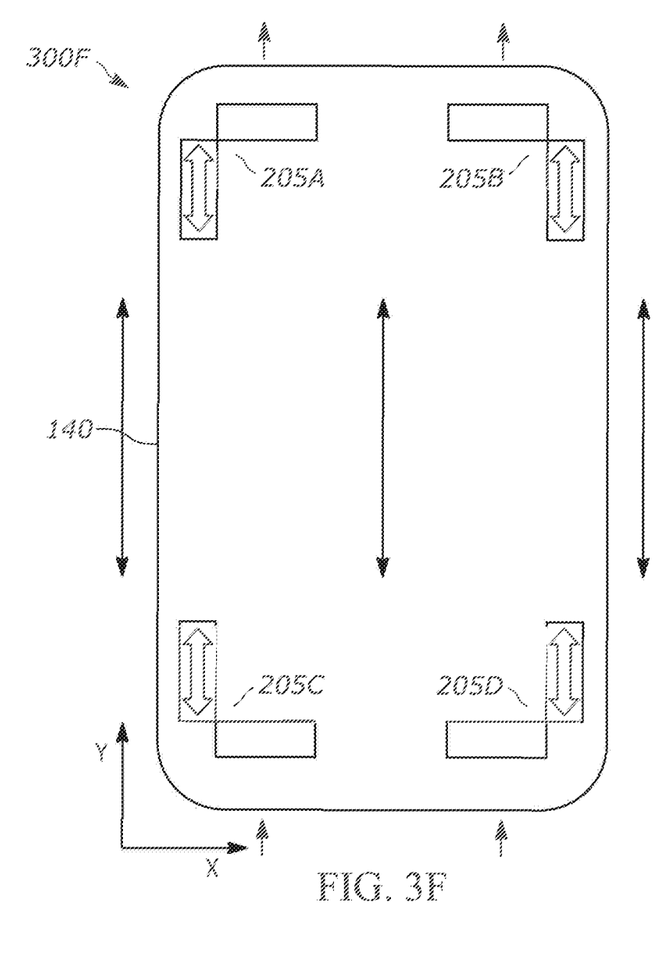
FIG. 3F is a free body diagram of the output forces of the actuators of the electronic communication device of FIG. 1 in accordance with some embodiments.
Figure 3G:
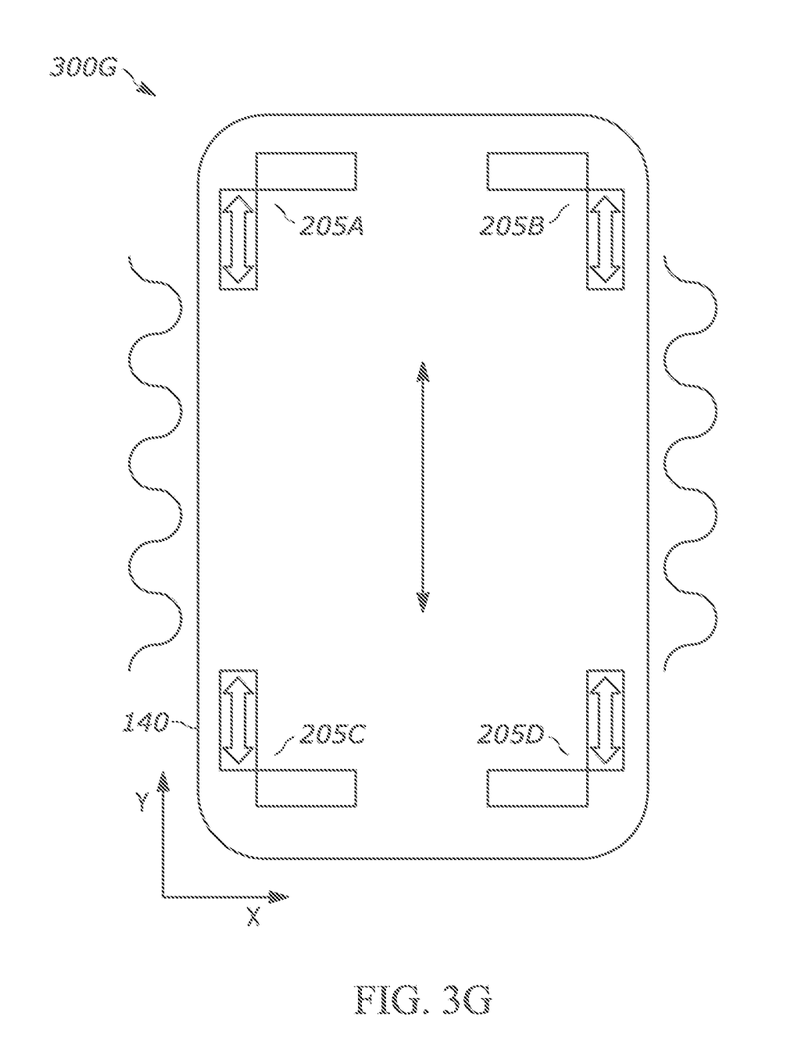
FIG. 3G is a free body diagram of the output forces of the actuators of the electronic communication device of FIG. 1 in accordance with some embodiments.

As shown in diagrams 300E and 300F of FIGS. 3E and 3F respectively, by controlling one or more actuators 130 of the pairs 205A-D as described above, the processor 105 may provide a sliding vibration (a rubbing motion), where certain points of the device 100 produce a pushing feedback. In some embodiments, the processor 105 may operate the actuators 130 at different frequencies while dynamically changing the phase at which one or more of the actuators is operated at to produce an edge wave vibration as shown in diagram 300G of FIG. 3G. In some embodiments, the electronic processor 105 is configured to control the actuator(s) 130 to provide additional types of predetermined vibration patterns.

Following deactivation of a haptic output (including a vibration pattern), the device 100 may experience a residual resonance/vibration (depending on the materials and/or layout of the electronic communication device 100). This may be an undesirable effect in cases where the desired haptic output is a brief but high amplitude and/or frequency vibration. Thus, it may be desirable to counter the effects of the residual vibrations.

Figure 4:
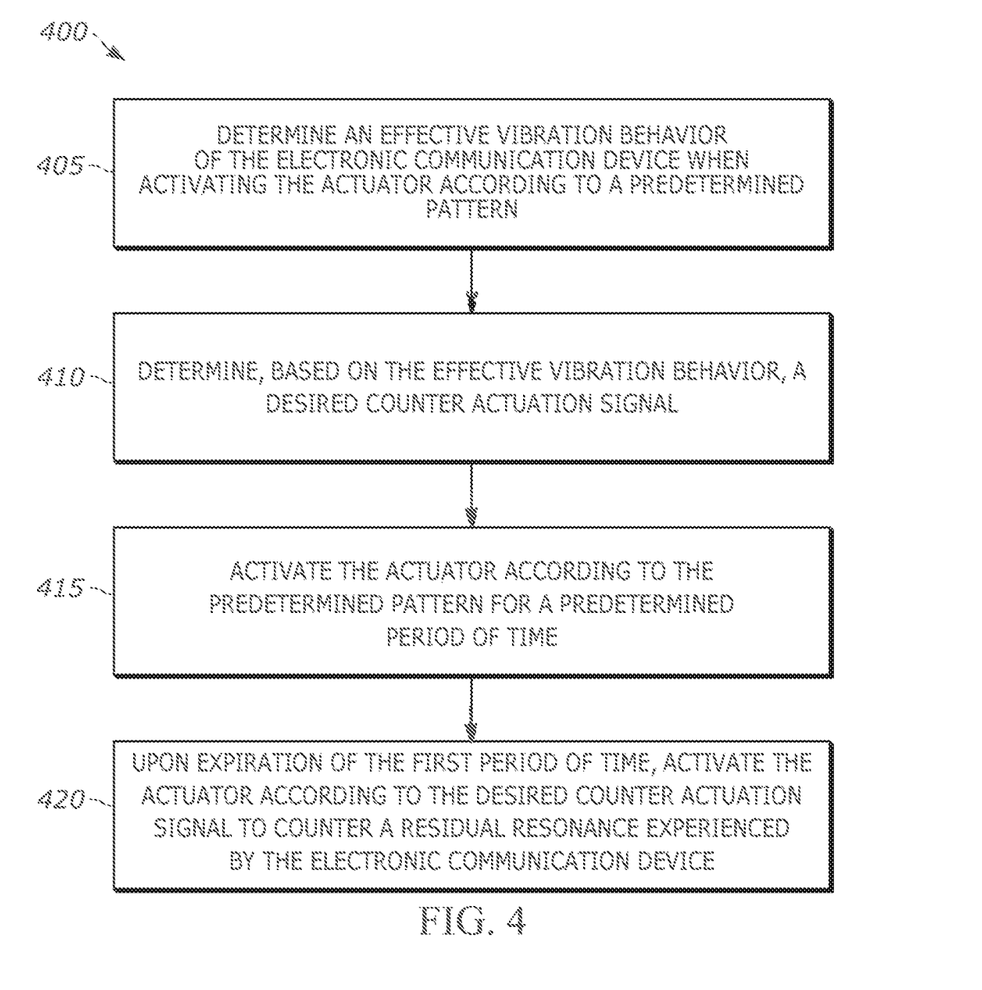
FIG. 4 is a flowchart of a method for countering a residual resonance experienced by the electronic communication device of FIG. 1 in accordance with some embodiments.

FIG. 4 is flowchart illustrating a method 400 of countering a residual resonance experienced by an electronic communication device due to an activation of an actuator within the housing of the electronic communication device in accordance with some embodiments. The method 400 is described as being performed by the electronic communication device 100 and, in particular, the electronic processor 105 and in terms of a single actuator 130. However, the methods described herein are applicable different numbers, types, and/or configurations of actuators 130 and may be implemented on or with multiple electronic processors.

Figure 5:
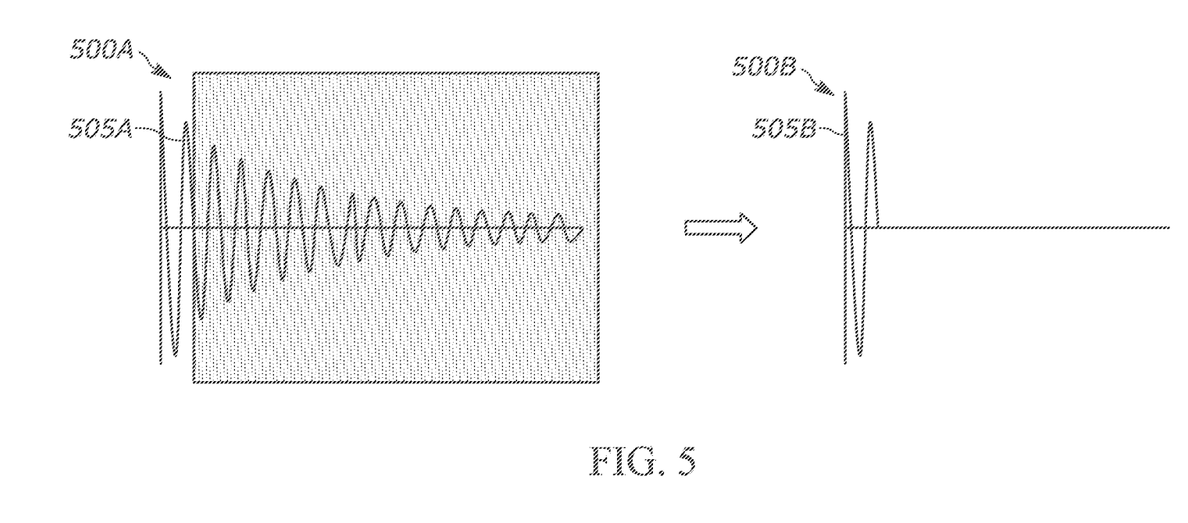
FIG. 5 is a signal diagram of the residual resonance experienced by the electronic communication device of FIG. 1 before and after applying the method of FIG. 4 in accordance with some embodiments.

At block 405, the electronic processor 105 determines an effective vibration behavior of the electronic communication device 100 when activating the actuator 130 according to a predetermined pattern. In one instance, the effective vibration behavior of the electronic communication device 100 includes the remnant acceleration/deceleration (vibrations) experienced by the electronic communication device 100 following providing a haptic output. The effective vibration behavior includes the residual resonance from the haptic output and may further include any kind of dampening effects (due to the physical construction of the device 100 and/or surface environment experienced by the device 100). FIG. 5 is a diagram 500A illustrating an example vibration function 505A illustrating an effective vibration behavior of the device 100 according to some embodiments.

Figure 6:
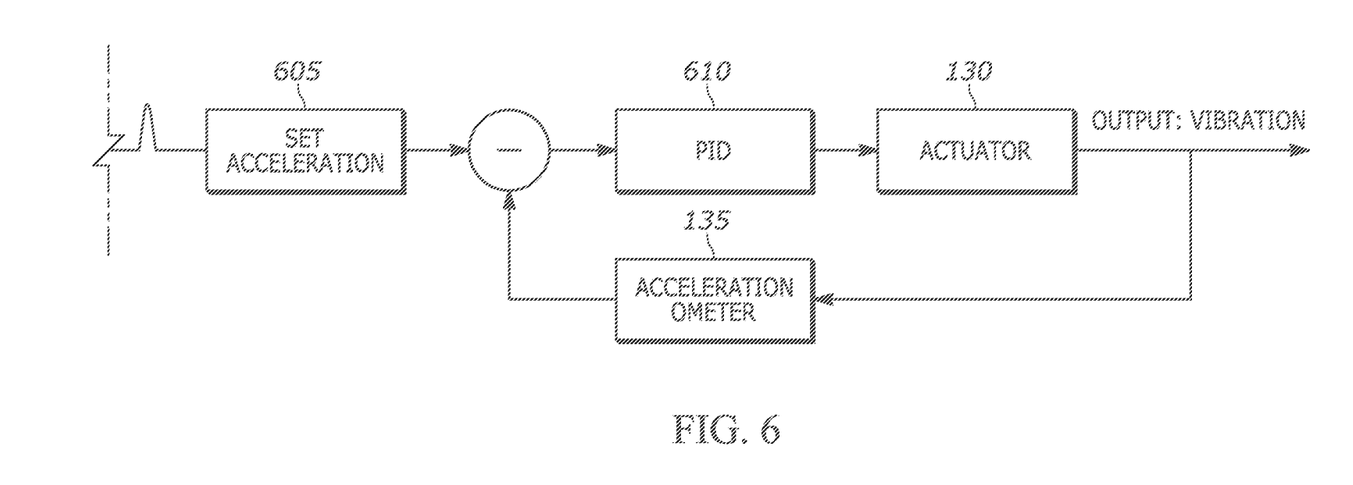
FIG. 6 is a control system diagram for determining a transfer function of the residual resonance experienced by the electronic communication device of FIG. 1 in accordance with some embodiments.

The effective vibration behavior of the device 100 may be determined based on a predetermined function. In some embodiments, the effective vibration behavior is determined via a closed loop control method. For example, FIG. 6 is a control system 600 for determining the effective vibration behavior of the electronic communication device 100 in accordance with some embodiments. At block 605, a desired haptic output level (acceleration) of the device 100 is requested (for example, automatically by the processor or set by a user of the device 100) and provided via the actuator 130. A difference between the desired haptic output level and the actual haptic output level of the device 100 and/or actuator 130 is determined via one or more measurements from the accelerometer 135. The resulting error is calculated via a controller (for example, by a proportional integral derivative (PID) controller 610). The PID controller 610 may be implemented in the processor 105. The controller 610 may then provide the resulting error to the actuator 130 to adjust the actual haptic output. The illustrated system 600 may be utilized in determining a effective vibration behavior for a single axis. To determine additional behaviors for additional axes, additional closed loop systems may be implemented and/or fused.

As mentioned above, the electronic processor 105 may be configured to, when determining the transfer function, determine a dampening effect of a surface environment experienced by the electronic communication device 100. The magnitude of the haptic output of the actuator 130 may accordingly be adjusted when activated based on the determined dampening effect.

Returning to FIG. 4, at block 410, the electronic processor 105 determines, based on the transfer function, a desired counter actuation signal and, at block 415, the processor 105 activates the actuator 130 according to the predetermined pattern for a predetermined period of time. At block 420, upon expiration of the predetermined period of time, the electronic processor 105 activates the actuator 130 according to the desired counter actuation signal to counter the residual resonance experienced by the electronic communication device 100. Thus, any residual vibrations caused by the activation of the actuator 130 are reduced and/or negated. For example, returning to FIG. 5, diagram 500B illustrates the effective vibration behavior experienced by the device 100 with the desired counter actuation signal applied (function 505B). As illustrated, to counter the residual resonance experienced by the electronic communication device 100 via the counter actuation signal, the user of the device 100 experiences an improved shorter haptic output.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic communication device comprising:
an actuator positioned within a housing of the electronic communication device; and
an electronic processor communicatively coupled to the actuator, the electronic processor configured to
determine an effective vibration behavior of the electronic communication device and a dampening effect of a surface environment experienced by the electronic communication device when activating the actuator according to a predetermined pattern;
determine, based on the effective vibration behavior, a desired counter actuation signal;
activate the actuator according to the predetermined pattern for a predetermined period of time; and
upon expiration of the predetermined period of time, activate the actuator according to the desired counter actuation signal to counter a residual resonance experienced by the electronic communication device.

2. The electronic communication device of claim 1, wherein the electronic communication device further includes an accelerometer and wherein the electronic processor is further configured to determine the effective vibration behavior of the electronic communication device based on a measurement from the accelerometer.

3. The electronic communication device of claim 1, wherein the electronic communication device further includes four pairs of perpendicular placed actuators including the actuator, each pair being positioned in a corner within the housing of the electronic communication device.

4. The electronic communication device of claim 1, wherein the electronic communication device further includes four multidimensional actuators including the actuator, each multidimensional actuator being positioned in a corner within the housing of the electronic communication device.

5. The electronic communication device of claim 1, wherein the predetermined pattern is at least one selected from the group consisting of a linear vibration, an angular vibration, a circular vibration, a sliding vibration, and a wave vibration.

6. A method of countering a residual resonance experienced by an electronic communication device due to an activation of an actuator within the housing of the electronic communication device, the method comprising:
- determining an effective vibration behavior of the electronic communication device and a dampening effect of a surface environment experienced by the electronic communication device when activating the actuator according to a predetermined pattern;
- determining, based on the effective vibration behavior, a desired counter actuation signal;
- activating the actuator according to the predetermined pattern for a predetermined period of time; and
- upon expiration of the predetermined period of time, activating the actuator according to the desired counter actuation signal to counter a residual resonance experienced by the electronic communication device.

7. The method of claim 6, wherein the electronic communication device further includes an accelerometer and wherein the determining the effective vibration behavior of the electronic communication device is based on a measurement from the accelerometer.

8. The method of claim 6, wherein the electronic communication device further includes four pairs of perpendicular placed actuators including the actuator, each pair being positioned in a corner within the housing of the electronic communication device.

9. The method of claim 6, wherein the electronic communication device further includes four multidimensional actuators including the actuator, each multidimensional actuator being positioned in a corner within the housing of the electronic communication device.

10. The method of claim 6, wherein the predetermined pattern is at least one selected from the group consisting of a linear vibration, an angular vibration, a circular vibration, a sliding vibration, and a wave vibration.

11. An electronic communication system comprising:
- an actuator positioned within a housing of the electronic communication system; and
- an electronic processor communicatively coupled to the actuator, the electronic processor configured to
  - determine an effective vibration behavior of the electronic communication system and a dampening effect of a surface environment experienced by the electronic communication device when activating the actuator according to a predetermined pattern;
  - determine, based on the effective vibration behavior, a desired counter actuation signal;
  - activate the actuator according to the predetermined pattern for a predetermined period of time; and
  - upon expiration of the predetermined period of time, activate the actuator according to the desired counter actuation signal to counter a residual resonance experienced by the electronic communication system.

12. The electronic communication system of claim 11, wherein the electronic communication system further includes an accelerometer and wherein the electronic processor is further configured to determine the effective vibration behavior of the electronic communication system based on a measurement from the accelerometer.

13. The electronic communication system of claim 11, wherein the electronic communication system further includes four pairs of perpendicular placed actuators including the actuator, each pair being positioned in a corner within the housing of the electronic communication system.

14. The electronic communication system of claim 11, wherein the electronic communication system further includes four multidimensional actuators including the actuator, each multidimensional actuator being positioned in a corner within the housing of the electronic communication system.

15. The electronic communication system of claim 11, wherein the predetermined pattern is at least one selected from the group consisting of a linear vibration, an angular vibration, a circular vibration, a sliding vibration, and a wave vibration.

* * * * *